United States Patent
Almehio et al.

(10) Patent No.: US 12,539,804 B2
(45) Date of Patent: *Feb. 3, 2026

(54) METHOD FOR MANAGING IMAGE DATA, AND VEHICLE LIGHTING SYSTEM

(71) Applicant: VALEO VISION, Bobigny (FR)

(72) Inventors: Yasser Almehio, Bobigny (FR); Constantin Prat, Bobigny (FR)

(73) Assignee: Valeo Vision, Bobigny (FR)

( * ) Notice: Subject to any disclaimer, the term of this patent is extended or adjusted under 35 U.S.C. 154(b) by 433 days.

This patent is subject to a terminal disclaimer.

(21) Appl. No.: 17/919,936

(22) PCT Filed: Apr. 22, 2021

(86) PCT No.: PCT/EP2021/060612
§ 371 (c)(1),
(2) Date: Oct. 19, 2022

(87) PCT Pub. No.: WO2021/214266
PCT Pub. Date: Oct. 28, 2021

(65) Prior Publication Data
US 2023/0202381 A1    Jun. 29, 2023

(30) Foreign Application Priority Data
Apr. 24, 2020 (FR) ...................... 2004129

(51) Int. Cl.
*H05B 45/10* (2020.01)
*B60Q 1/14* (2006.01)
(Continued)

(52) U.S. Cl.
CPC .......... *B60Q 1/1407* (2013.01); *F21S 41/153* (2018.01); *G06T 9/00* (2013.01);
(Continued)

(58) Field of Classification Search
CPC . B60Q 1/1407; B60Q 2400/40; F21S 41/153; G06T 9/00; H05B 45/10;
(Continued)

(56) References Cited

U.S. PATENT DOCUMENTS

| 6,061,475 A * | 5/2000 | Blair ...................... G06T 9/004 382/239 |
| 2004/0143380 A1* | 7/2004 | Stam .................... H05B 47/165 340/467 |

(Continued)

OTHER PUBLICATIONS

European Patent Office, International Search Report (with English translation) and Written Opinion of corresponding International Application No. PCT/EP2021/060612, dated Jul. 6, 2021.

(Continued)

*Primary Examiner* — Henok Shiferaw
*Assistant Examiner* — Woo C Rhim
(74) *Attorney, Agent, or Firm* — Valeo Vision

(57) ABSTRACT

The invention provides a method for managing image data in a motor vehicle lighting system, the lighting system including at least one lighting module intended to project light beams, the light beams being generated from data relating to the selection of at least one image, each image being respectively defined by a matrix including a plurality of horizontal or vertical rows of pixels, with each pixel having a numerical value related to a light intensity of the pixel. The method includes determining whether the pixel under analysis is considered to be a significant point of inflection of the image, so as to transmit it to at least one lighting module, so that it is able to project a resulting image.

9 Claims, 9 Drawing Sheets

(51) Int. Cl.
  *F21S 41/153* (2018.01)
  *G06T 9/00* (2006.01)
  *H05B 47/105* (2020.01)
(52) U.S. Cl.
  CPC ........... *H05B 45/10* (2020.01); *H05B 47/105* (2020.01); *B60Q 2400/40* (2013.01)
(58) Field of Classification Search
  CPC .... H05B 47/105; H05B 45/44; H05B 47/125; Y02B 20/40; G06V 20/588; G06V 20/584; G06V 20/582; G08G 1/167
  See application file for complete search history.

(56) References Cited

U.S. PATENT DOCUMENTS

| | | | | |
|---|---|---|---|---|
| 2005/0052465 | A1* | 3/2005 | Moore | G06F 3/023 345/603 |
| 2006/0106518 | A1* | 5/2006 | Stam | B60Q 1/1423 701/49 |
| 2013/0250113 | A1* | 9/2013 | Bechtel | G06V 20/588 348/148 |
| 2016/0243980 | A1* | 8/2016 | El Idrissi | B60Q 1/1423 |
| 2016/0281952 | A1* | 9/2016 | Kliebisch | F21S 41/285 |
| 2019/0016256 | A1* | 1/2019 | Vargas Rivero | B60Q 1/549 |
| 2020/0084854 | A1* | 3/2020 | Bonne | H05B 47/105 |
| 2022/0034469 | A1* | 2/2022 | Mochizuki | F21S 41/365 |
| 2023/0202381 | A1* | 6/2023 | Almehio | G06T 9/00 315/82 |

OTHER PUBLICATIONS

Gardenhire L.W.: "Redundancy Reduction the Key to Adaptive Telemetry", Proceedings National Telemetry Conference, XX, XX, (Jan. 1, 1964) pp. 1-16, Radiation Inc., Melbourne, FL.

Ehrman L.: "Analysis of Some Redundancy Removal Bandwidth Compression Techniques", Proceedings of the IEEE, IEEE, vol. 3, No. 55 (Mar. 1, 1967) pp. 278-287, New York, US.

* cited by examiner

110

125   120

124

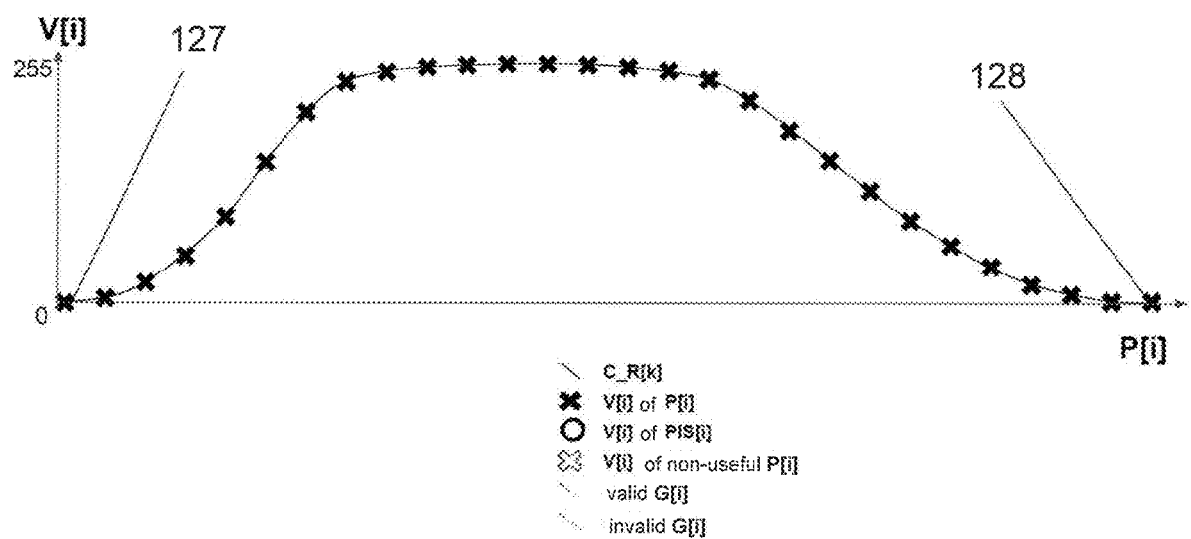

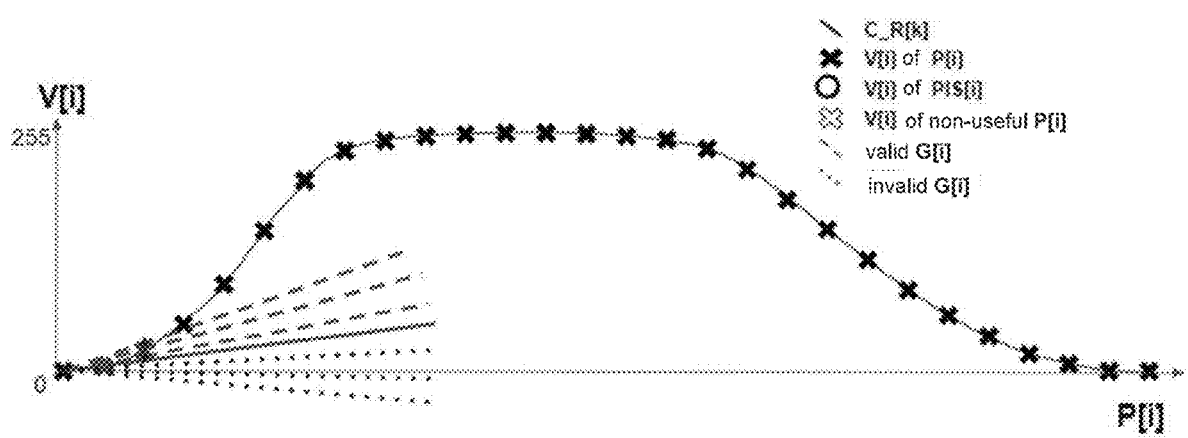

Fig 7

| Photométrie/Photometry | | | | Fonctions / Features | | | | | Compression (E_max, G_Err => constant) | | | | Compression (E_Max, G_Err => variable) | | | |
|---|---|---|---|---|---|---|---|---|---|---|---|---|---|---|---|---|
| LB | HB | OFF | DBL | ADB | TSAG | RW | LA | LA Center | E Max | G Err | Mbit/s | % | E Max | G Err | Mbit/s | % |
| x | | | | | | | | | 3 | 16/255 | 1917 | 92.51 | 3 | 16/255 | 1917 | 92.51 |
| x | | | | | | x | | | 3 | 16/255 | 2913 | 88.62 | 3 | 32/255 | 2797 | 89.07 |
| x | | | | | | | x | | 3 | 16/255 | 2925 | 88.57 | 3 | 32/255 | 2775 | 89.16 |
| x | | | | | | | | x | 3 | 16/255 | 2373 | 90.73 | 3 | 32/255 | 2317 | 90.95 |
| x | | | x | | | | | | 3 | 16/255 | 1741 | 93.20 | 3 | 16/255 | 1731 | 93.20 |
| | x | | | | | | | | 3 | 16/255 | 3313 | 87.06 | 4 | 16/255 | 2649 | 89.65 |
| | x | | | | | x | | | 3 | 16/255 | 3975 | 84.47 | 5 | 32/255 | 2725 | 89.36 |
| | x | | | | | | x | | 3 | 16/255 | 4019 | 84.30 | 5 | 32/255 | 2749 | 89.26 |
| | x | | | | | | | x | 3 | 16/255 | 3561 | 86.09 | 5 | 32/255 | 2365 | 90.76 |
| | x | | | | x | | | | 3 | 16/255 | 3981 | 84.45 | 5 | 32/255 | 2781 | 89.14 |
| | x | | | | x | x | | | 3 | 16/255 | 4635 | 81.89 | 6 | 64/255 | 2801 | 89.06 |
| | x | | | | x | | x | | 3 | 16/255 | 4679 | 81.72 | 6 | 96/255 | 2741 | 89.29 |
| | x | | | | x | | | x | 3 | 16/255 | 4231 | 83.47 | 5 | 64/255 | 2779 | 89.14 |
| | x | | | | | x | | | 3 | 16/255 | 3535 | 86.19 | 5 | 32/255 | 2403 | 90.61 |
| | x | | | | | x | x | | 3 | 16/255 | 4197 | 83.61 | 6 | 64/255 | 2507 | 90.21 |
| | x | | | | | x | | x | 3 | 16/255 | 4241 | 83.43 | 6 | 64/255 | 2569 | 89.86 |
| | x | | | | | x | | x | 3 | 16/255 | 3783 | 85.22 | 5 | 64/255 | 2523 | 90.14 |
| | x | | | x | x | | | | 3 | 16/255 | 4237 | 83.45 | 6 | 64/255 | 2805 | 89.04 |
| | x | | | x | x | x | | | 3 | 16/255 | 4891 | 80.89 | 7 | 96/255 | 2725 | 89.36 |
| | x | | | x | x | | x | | 3 | 16/255 | 4935 | 80.72 | 7 | 96/255 | 2767 | 89.19 |
| | x | | | x | x | | | x | 3 | 16/255 | 4487 | 82.47 | 6 | 64/255 | 2743 | 89.29 |
| | x | | x | | | | | | 3 | 16/255 | 2541 | 90.07 | 4 | 16/255 | 2055 | 91.91 |
| | x | | x | | x | | | | 3 | 16/255 | 3693 | 85.57 | 5 | 64/255 | 2683 | 89.45 |
| | x | | x | x | x | | | | 3 | 16/255 | 4411 | 82.77 | 7 | 96/255 | 2687 | 89.38 |
| | x | | x | x | | x | | | 3 | 16/255 | 4477 | 82.51 | 7 | 96/255 | 2705 | 89.40 |
| | x | | x | x | | | x | | 3 | 16/255 | 4127 | 83.88 | 6 | 64/255 | 2757 | 89.19 |
| | | x | | | | x | | | 3 | 16/255 | 1349 | 94.73 | 3 | 16/255 | 1349 | 94.73 |
| | | x | | | | | x | | 3 | 16/255 | 1683 | 93.43 | 3 | 16/255 | 1683 | 93.43 |
| | | x | | | | | | x | 3 | 16/255 | 1051 | 95.89 | 3 | 16/255 | 1051 | 95.89 |
| | | x | | | | | | | 3 | 16/255 | 203 | 99.21 | 3 | 16/255 | 203 | 99.21 |

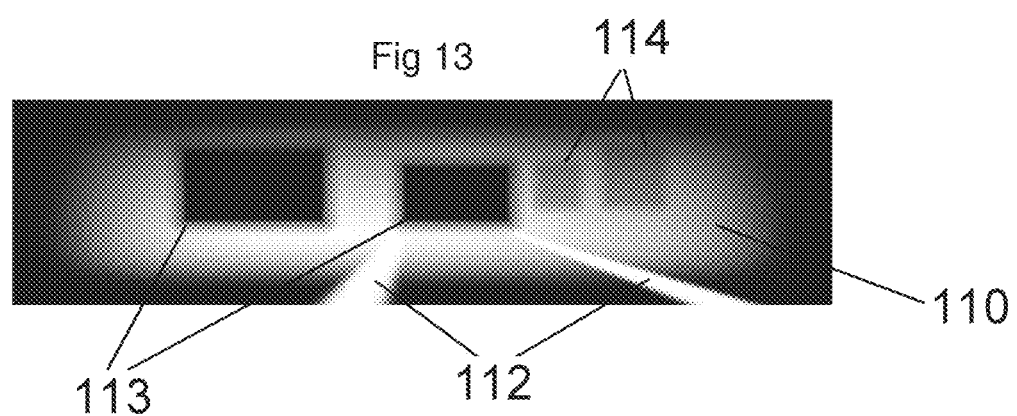
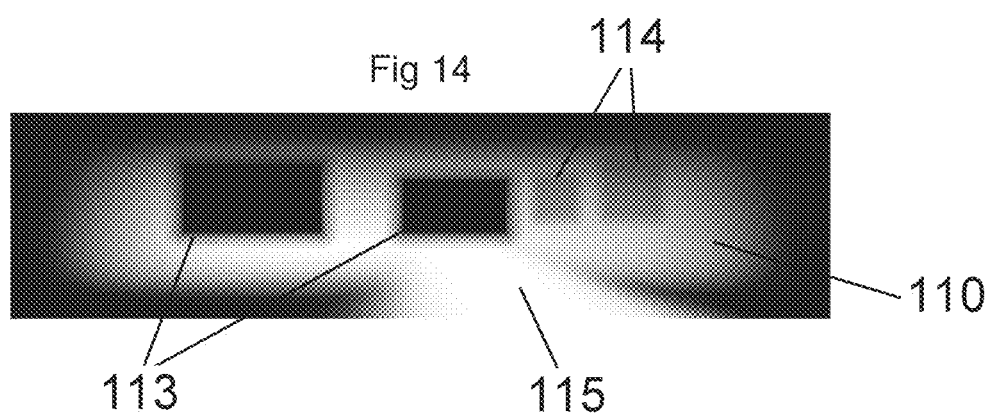
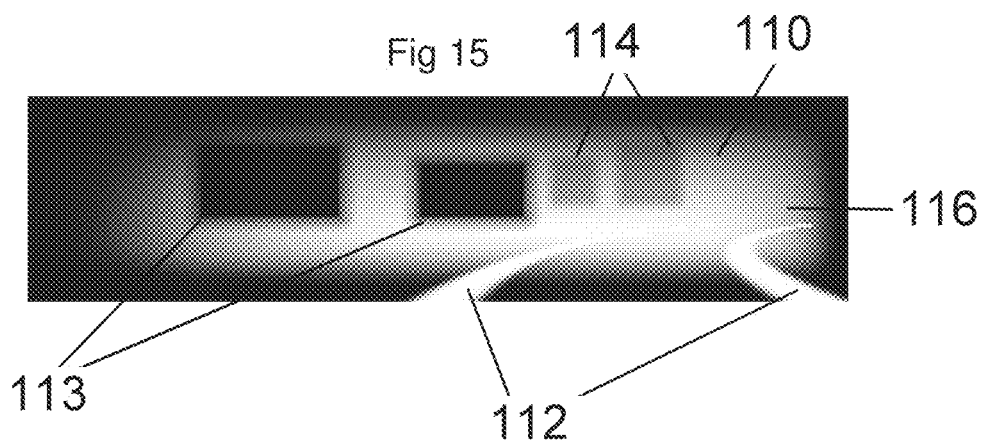

METHOD FOR MANAGING IMAGE DATA, AND VEHICLE LIGHTING SYSTEM

CROSS-REFERENCE TO RELATED APPLICATIONS

This application is filed under 35 U.S.C. § 371 U.S. National Phase of International Application No. PCT/EP2021/060612 filed Apr. 22, 2021 (published as WO2021214266), which claims priority benefit to French Application No. 2004129 filed on Apr. 24, 2020, the disclosures of which are herein incorporated by reference in their entirety.

TECHNICAL FIELD

This invention relates to the field of vehicle lighting systems, and more particularly to managing image data for controlling light sources of a vehicle.

BACKGROUND OF THE INVENTION

Modern lighting systems comprise in particular light sources that now make it possible to project a high-definition light beam. The desired projection of high-definition light may be obtained via the light sources and from images, or image patterns, that the sources receive in order to display them and thus project a given light beam. These images or image patterns are able to achieve very high resolutions now, in particular depending on the resolution of the light source that is used. By way of example, the light source may have at least 4 000 to 30 000 pixels, thus making it possible to generate a light beam from an image with this level of resolution.

To succeed in generating such high-definition light beams, multiple light sources may be used, or even combined, which requires controlling them and finely synchronizing these sources in order to provide well-controlled, varied and adaptive lighting functionalities.

Vehicles therefore carry increasingly greater numbers of light sources, which use increasingly heavy high-definition image data, this involving a large amount of data that have to be managed by a vehicle control unit and communicated via a transmission means between the control unit and the one or more light sources. To do this, for example, a CAN protocol data bus is often used to transfer such data between the control unit and the light source. However, these data transmission means have the drawback of having a limited bandwidth, not allowing for example a bit rate of 2 to 5 Mbps to be exceeded in general. As a result, difficulties arise in transmitting the large amount of data required for said high-definition images over these limited networks. In addition, these networks are also used for the communication of other vehicle data, which means that the bandwidth available for high-definition image data may be even lower, for example limited to a range of 70 to 90% of the maximum bit rate possible over the data transmission network.

BRIEF SUMMARY OF THE INVENTION

By way of example, to communicate high-definition image data for the projection of a lighting function with a resolution of 20 000 pixels, the bit rate required over a CAN-FD transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to ensure the one or more associated lighting functions, while observing the bit rate and bandwidth constraints of this same network.

Known compression methods have been contemplated to overcome this problem, but they have all proven to be inadequate with respect to high-beam specificity, thereby hindering a sufficient reduction in the bandwidth as required by motor vehicle manufacturers.

To achieve this, provision could be made for multiple levels or iterations of data compression to be carried out, until succeeding in meeting a desired bandwidth. Still, such an approach has a very significant impact on the display quality of the projected lighting functions, since with each compression performed, display quality is affected; it is reduced.

However, for certain lighting functions, for example adaptive driving beams (ADBs) and road writing (RW), display quality cannot be overly degraded, as otherwise the user experience will be significantly lessened, with the light information projected by the light beam being made unclear, inadequate or even illegible.

There is therefore a need for a technical solution in order to overcome the abovementioned drawbacks.

The invention provides an at least partial solution to the technical problems highlighted above by way of a method for managing image data in a motor vehicle lighting system, said lighting system comprising at least one lighting module intended to project light beams, said light beams being generated from data relating to the selection of at least one original image, each original image being respectively defined by a matrix comprising a plurality of horizontal and/or vertical rows of pixels, wherein each pixel is characterized by a numerical value $V[i]$ related to a light intensity of said pixel, said method comprising the following steps:

receiving an instruction to activate at least one original image intended to be projected;

from the first row to the last row of the matrix, sequentially carrying out the following steps, from the first pixel to the last pixel of the row under analysis:

calculating a gradient value based on the numerical value $V[i]$ of the pixel under analysis and on the numerical value $V[i+1]$ of the adjacent pixel;

determining whether the pixel under analysis is a significant point of inflection of a curve relating to the row under analysis, based on E_Max the difference in intensity between the original pixel and the compressed pixel, and based on G_Err the spatial difference between the original pixel and the compressed pixel;

if the pixel under analysis is considered to be a significant point of inflection, then the pixel under analysis will be saved as a compressed pixel in a list to be transmitted, otherwise the pixel under analysis is not saved in this list;

the previous steps are reiterated until the last pixel of the last row of the matrix;

and in that the list of compressed pixels of the matrix is transmitted to at least one lighting module so that it is able to project a resulting image.

According to one embodiment, the original image is selected from among a set of:

photometries, such as LB, and/or HB, and/or OFF, and/or DBL, and/or lighting functions, such as ADB, and/or TSAG, and/or RW, and/or LA, and/or LA_Center.

Advantageously, in another embodiment, the numerical value V[i] of each pixel corresponds to grayscale levels, and more particularly, the light intensity of each pixel is characterized by a number on a scale ranging from 0 to 255.

According to one embodiment, a step of decompressing the list of compressed pixels received at the lighting modules is performed:

- by way of a linear interpolation of the sub-intervals between the significant points of inflection of the curve formed by each row of the matrix, or
- by way of a polynomial interpolation of the sub-intervals between the significant points of inflection of the curve formed by each row of the matrix, or
- by way of an interpolation, using the Bézier curve method, of the sub-intervals between the significant points of inflection of the curve formed by each row of the matrix, or
- by way of an interpolation, using the parametric adaptation method, of the sub-intervals between the significant points of inflection of the curve formed by each row of the matrix, or
- by way of an interpolation, using the least squares method, of the sub-intervals between the significant points of inflection of the curve formed by each row of the matrix, or
- by way of an interpolation, using the exponential modeling method, of the sub-intervals between the significant points of inflection of the curve formed by each row of the matrix, or
- by way of an interpolation, using the Fourier series method, of the sub-intervals between the significant points of inflection of the curve formed by each row of the matrix, or
- by way of an interpolation, using the Gaussian modeling method, of the sub-intervals between the significant points of inflection of the curve formed by each row of the matrix, or
- by way of an interpolation, using the power series method, of the sub-intervals between the significant points of inflection of the curve formed by each row of the matrix, or
- by way of an interpolation, using the sums of sines models method, of the sub-intervals between the significant points of inflection of the curve formed by each row of the matrix, or
- by way of an interpolation, using the Weibull distribution method, of the sub-intervals between the significant points of inflection of the curve formed by each row of the matrix, or
- by way of an interpolation, using the personalized models method, of the sub-intervals between the significant points of inflection of the curve formed by each row of the matrix.

In another embodiment, the compressed pixels are linked only to a specific part of the original image.

According to a second aspect of the invention, the invention relates to a motor vehicle lighting system comprising:

- at least one lighting module comprising a plurality of light sources able to project at least one photometry and/or lighting function from compressed data,
- a multiplexed bus for transmitting compressed data to at least one lighting module,
- a control unit configured so as to implement all of the steps of the method according to any one of the preceding features.

In one embodiment, the lighting module furthermore comprises a control unit configured so as to be able to decompress the list of compressed pixels.

In another embodiment, the control unit of each lighting module comprises a memory that stores at least one Welcome and/or one Goodbye scenario.

According to another advantageous embodiment, at least one lighting module comprises at least one semiconductor light source, such as LEDs, and in particular a pixelated LED source.

In comparison with incandescent lighting, semiconductor lighting generates visible light with lower heat production and less energy dissipation. The generally low weight of a semiconductor electronic lighting device affords greater resistance to impacts and vibrations than brittle glass tubes/bulbs and long, thin filament wires. They are also not subject to filament evaporation, which may increase the service life of the lighting device. Some examples of these types of lighting comprise semiconductor light-emitting diodes (LEDs), organic light-emitting diodes (OLEDs), or polymer light-emitting diodes (PLEDs) as light sources instead of electrical filaments, plasma or gas.

Unless otherwise defined, all terms (including technical and scientific terms) used in this document should be interpreted in accordance with the standard practices of the profession. It is also understood that terms in common use are to be interpreted as customary in the relevant art and not in an idealized or overly formal sense, unless expressly defined as such herein.

BRIEF DESCRIPTION OF THE DRAWINGS

To supplement the description and to allow better understanding of the invention, a set of figures is provided. These figures form integral parts of the description and illustrate one embodiment of the invention, which should not be interpreted as limiting the scope of the invention, but merely as an example of how the invention may be carried out. The figures are as follows:

FIG. 3 illustrates a curve representing one of the rows of the image according to FIG. 1, according to one embodiment of the invention;

FIGS. 4a and 4b illustrate schematic depictions relating to the steps of determining significant points of inflection of the curve according to FIG. 3, according to the method according to the invention;

FIG. 7 illustrates a table summarizing the compression rates of the photometries and/or lighting functions with respect to the configuration of the parameters E_max and G_Err, according to the invention;

FIG. 13 illustrates a schematic depiction of a photometry relating to an HB with the TSAG, ADB and LA lighting functions activated;

FIG. 14 illustrates a schematic depiction of a photometry relating to an HB with the TSAG, ADB and LA_Center 115 lighting functions activated;

FIG. 15 illustrates a schematic depiction of a photometry relating to HB and DBL, with the TSAG, ADB and LA lighting functions activated.

DETAILED DESCRIPTION OF THE INVENTION

Figure 1:
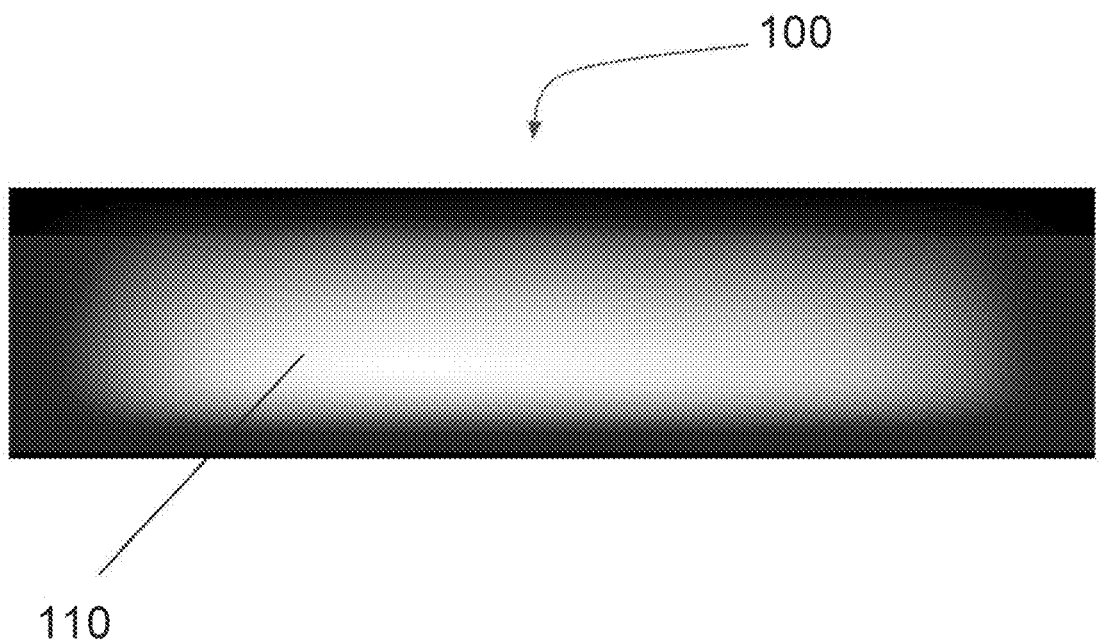
FIG. 1 illustrates a schematic depiction of an image relating to a high-beam photometry, according to one embodiment of the invention.

In the remainder of the description, a set of abbreviations, references and/or numbers have been used, their definitions have been listed below for a better understanding of the figures, but certain references are not illustrated in order to lighten the figures, but are known to those skilled in the art:

SYS 200: Motor vehicle lighting system comprising at least one lighting module HL[z], a multiplexed bus CAN 240, and a control unit PCM 230;

HL[z] 220: lighting module, essential component for the projection of light beams of the same resolution, z corresponding to the number of the module;

I[x] 100: original image relating to a set of non-exhaustive photometries or lighting functions of the type LB 111, HB 110, OFF, DBL 116, ADB 113, TSAG 114, RW, LA 112, LA_Center 115.

M[x] 120: corresponding to the matrix equivalent of the image I[x] 100.

LB 111: (low beam) photometry representative of a low beam;

HB 110: (high beam) photometry representative of a high beam;

OFF: photometry where the numerical value V[i] of all of the pixels P[i] 125 of the image I[x] 100 are at 0 or off;

DBL 116: (dynamic bending light) photometry that allows dynamic directional lighting, in other words a horizontal displacement of the maximum intensity of an LB 111 or HB 110 photometry depending on the angle of rotation of the steering wheel of a motor vehicle;

ADB 113: (adaptive driving beam) function that allows lighting with a high-beam photometry while avoiding dazzling other road users;

TSAG 114: (traffic sign anti-glare) lighting function that makes it possible to avoid dazzling the traffic signs on a road following the projection of light beams from the motor vehicle;

RW: (road writing) lighting function that allows the projection, onto the road, of patterns visible to the driver and/or to road users;

LA: (line assist) lighting function that allows the projection of line-type patterns onto the road, in particular to delimit a portion of road to be taken by the motor vehicle or to present an obstacle avoidance strategy;

LA_Center 115: is a variant of LA 112, except that it is projected at the center of the road, in particular to indicate a direction of the vehicle.

P[i] 125: Pixel of the image 100, where i is a variable ranging from an initial value 1 to a final value F;

V[i]: Numerical value of the pixel P[i] 125, where i is a variable ranging from an initial value 1 to a final value F;

G[i]: Value of the gradient of P[i] 125

R[k] 124: k-th rows of the image I[x] 100 or of the matrix M[x] 120, where k is a variable ranging from an initial value 1 to a final value D;

C_R[k]: Curve relating to the k-th row R[k] 124;

PIS[i]: Significant point of inflection of a curve C_R[k], the point where a change in concavity of the curve C_R[k] takes place, the PIS[i] is considered to be a pixel intended to be compressed, where i is a variable ranging from an initial value 1 to a final value F;

E_Max: (error max) Difference in intensity between the original pixel P[i] 125 and the compressed pixel PIS[i];

E_Max_V[i]: (current error max) Maximum tolerated difference between the value V[i] of the pixel P[i] 125 of the original image I[x] and the value of the compressed pixel PIS[i];

G_Err: (gradient error) Spatial difference between the original pixel P[i] 125 and the compressed pixel PIS[i];

PCM 230: (pixel controller module), a control unit intended to drive a set of pixels of lighting modules via a control unit UC[z] 210;

UC[z] 210: Control unit, also called driver, intended to control a lighting module. Each control unit UC[z] 210 interacts as a "slave" with respect to the control unit PCM 230, which is considered to be a "master".

The exemplary embodiments are described in sufficient detail to allow those of ordinary skill in this art to be able to implement the systems and processes described below. It is important to understand that the embodiments may be provided in a number of alternative forms and should not be construed as being limited to the examples presented below.

Consequently, although an embodiment may be modified in various ways and take various alternative forms, specific embodiments thereof are shown in the drawings and described in detail below by way of example. No limitation to the particular forms disclosed is intended. Rather, all modifications, equivalents and alternatives falling within the scope of the appended claims are to be included.

FIG. 1 illustrates a schematic depiction of an image I[x] 100, referred to as original image, relating to an HB 110 (high beam) photometry of a motor vehicle lighting device HL.

Figure 2:
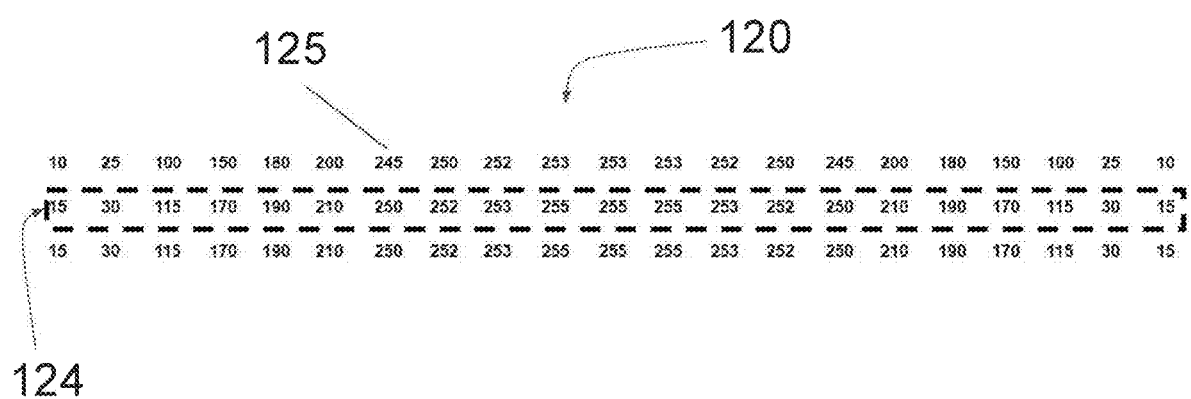
FIG. 2 illustrates a partial matrix of pixels of the photometry according to FIG. 1, according to one embodiment of the invention.

According to the invention, each image I[x] 100 has its equivalent in the form of a matrix M[x] 120 of pixels P[i] 125, each pixel P[i] 125 being characterized by a numerical value V[i] linked to a light intensity on a scale ranging from 0, corresponding to black, up to 255, corresponding to white. FIG. 2 illustrates one embodiment relating to a partial matrix M[x] 120 of pixels P[i] 125 with a photometry corresponding to the high beams HB 110 according to FIG. 1.

Nowadays, a modern motor vehicle has a control unit, commonly called PCM 230 (for pixel controller module), intended to drive a set of pixels of lighting modules HL[z] 220 via a control unit UC[z] 210, where the variable z ranging from 1 to n corresponds to the number assigned to the lighting module HL[z] 220. The control unit PCM 230 and each control unit UC[z] 210 comprises, respectively and in a non-exhaustive manner, at least one microprocessor and a memory (not referenced) configured so as to allow the implementation of a method for driving the projection of light beams from a motor vehicle lighting device HL according to the invention.

The control unit PCM 230 is configured such that, depending on data collected from a set of sensors distributed in the motor vehicle and on the environmental context in which said vehicle is moving, said control unit PCM 230 is capable of deciding, in complete autonomy or under the impulse of a driver, or on the behavior of said driver on the road, to activate or deactivate at least one regulatory photometry and/or lighting function. In the context of this invention, the two concepts of photometry and lighting function are distinct. Indeed, it will be considered, in a non-exhaustive list, that the term photometry encompasses an image I[x] 100, with x ranging from 1 to 4, where:

I[1] comprises an equivalent matrix M[1] corresponding to a high beam HB 110;

I[2] comprises an equivalent matrix M[2] corresponding to a low beam LB 111;

I[3] comprises an equivalent matrix M[3] where all of the pixels have a numerical value V[i] of 0, in other words all of the pixels P[i] 125 are off, with i ranging from 1 to F;

I[4] comprises an equivalent matrix M[4] corresponding to a dynamic bending light DBL 116.

Likewise, it will be considered, in a non-exhaustive list, that the term lighting function encompasses an image I[x] 100, with x ranging from 5 to 9, where:

I[5] comprises an equivalent matrix M[5] corresponding to an ADB 113 (adaptive driving beam) function that allows lighting with an LB 111, HB 110 or DBL 116 photometry while avoiding dazzling other road users;

I[6] comprises an equivalent matrix M[6] corresponding to a TSAG 114 (traffic sign anti-glare) function that makes it possible to avoid dazzling the traffic signs on a road following the projection of light beams from the motor vehicle;

I[7] comprises an equivalent matrix M[7] corresponding to an RW (road writing) function that allows the projection, onto the road, of patterns visible to the driver and/or to road users;

I[8] comprises an equivalent matrix M[8] corresponding to an LA (line assist) function that allows the projection of line-type patterns onto the road with or without a sensation of the lines scrolling, so as to delimit a portion of road to be taken by the motor vehicle or to project an obstacle avoidance strategy;

I[9] comprises an equivalent matrix M[9] corresponding to an LA_Center 115 function, which is a variant of the LA function, except that it is projected at the center of the road, in particular to indicate a direction of the vehicle.

The invention is in no way limited to just the photometries and lighting functions mentioned above, and it goes without saying that images relating to a welcome/goodbye scenario, or other photometries/lighting functions specific to the regulations of a country or region of the world could be added or updated.

According to the invention, a database comprising a set of matrices M[x] 120 of photometries and lighting functions possible on a road, in particular depending on the respective regulations, is recorded in the memory of the control unit PCM 230.

The control unit PCM 230, following the reception of an instruction from the driver or on its own initiative with regard to the environmental context of the motor vehicle, activates the projection of an image I[x] 100, and the corresponding matrix M[x] 120 is then selected from the database saved in the memory of the control unit PCM 230.

Figure 4B:
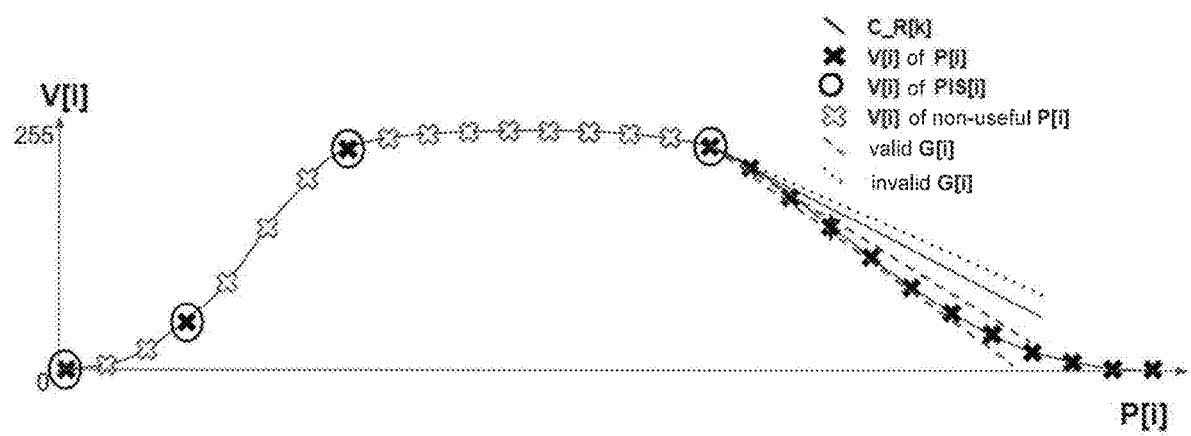

In a first embodiment of the invention, illustrated in particular in FIG. 4a and FIG. 4b, for each row R[k] 124 of the matrix M[x] 120 according to FIG. 2, with k ranging from the first row k=1 to the last row k=D, this gives a curve C_R[k] according to FIG. 3.

The control unit PCM 230 then sequentially carries out the following steps for each of the curves C_R[k], from the first pixel P[1] 127 to the last pixel P[F] 128 of the row R[k] 124:

calculating a gradient value G[i] based on the numerical value V[i] of the pixel P[i] 125 under analysis and on the numerical value V[i+1] of the adjacent pixel PIS [i+1]. Such calculation of the gradient G[i] is performed as follows: G[i]=V[i+1]−V[i], with i ranging from 1 to F;

determining whether the pixel P[i] 125 under analysis is a significant point of inflection PIS[i] of the curve C_R[k] relating to the row R[k] 124;

To obtain the significant point of inflection PIS[i], the control unit PCM 230:

determines a value E_Max_V[i] corresponding to the maximum tolerated difference between the value V[i] of the pixel P[i] 125 under analysis of the original image I[x] 100 and the value V[i] of the compressed pixel PIS[i]. Such calculation of E_Max_V[i] is performed as follows E_Max_V[i]=E_Max+G[i]*G_Err, where E_Max and G_Err are parameters that may be constant or variable depending on the desired compression strategy. E_max corresponds to the difference in intensity between the original pixel P[i] 125 and the compressed pixel PIS[x] and G_Err corresponds to the spatial difference between the original pixel P[i] 125 and the compressed pixel PIS [x];

determines the list of vectors or gradients G[i] close to the pixel P[i] 125 under analysis. This list of vectors or gradients G[i] is between the value G[i]−E_Max_V[i] and the value G[i]+E_Max_V[i];

as long as the list of vectors or gradients G[i] is greater than 0, then, for each vector or gradient G[i] of the list, if the following condition |V[i−a]+G[i−a]*(P[i−a]−P[i])−V[i]|>E_Max_V[i] is met, then all vectors or gradients G[i] will be considered to be invalid and removed from the list of gradients, otherwise it will be considered to be valid; this step is reiterated for as long as the list of gradients G[i] is greater than 0, otherwise the pixel P[i] 125 will be considered to be a pixel to be compressed and will be saved in the list LPIS [i] of compressed pixels PIS [i] to be transmitted. It should be noted that the value of "a" ranges from 1 to M, and corresponds to the number of pixels for which the condition is true. As soon as the condition becomes false, then the value of "a" is reset to 1 in order to move on to the analysis of the adjacent pixel P[i+1].

FIG. 7 illustrates a table summarizing the compression rates of the photometries and/or lighting functions with respect to the configuration of the parameters E_max and G_Err, according to one embodiment of the invention. These values result from experimental data. According to the invention, it appears that, when the values E_Max and G_Err are respectively constant, a desired compression rate is achieved, depending on the activation of at least one photometry and/or lighting function.

Thus, in one embodiment, when the value E_Max is set to 3 and/or when the value G_Err is set to 16/255, the compression rate fluctuates relatively with an average value close to 85% with a margin of +/−5% with respect to the photometry and/or functions that are activated.

In another embodiment, when a photometry relating to a low beam LB 111 is activated, then the value of E_Max is set to 3, and:

in the absence of activated lighting functions such as ADB 113, TSAG 114, RW, LA 112, LA_Center 115, then the value of G_Err is set to 16/255, or if one of the RW, LA 112, LA_Center 115 lighting functions is activated, then the value of G_Err is set to 32/255, or if a DBL 116 photometry is activated, then the value of G_Err is set to 16/255.

In another embodiment, when a photometry relating to the high beams HB 110 is activated:

in the absence of activated ADB 113, TSAG 114, RW, LA 112, LA_Center 115 lighting functions, or when DBL 116 photometry is activated, then the value E_Max is set to 4 and the value G_Err is set to 16/255;

when the ADB 113, or TSAG 114, or RW, or LA 112, or LA_Center 115 lighting functions are activated, then the value E_Max is set to 5 and the value G_Err is set to 32/255;

when the following lighting functions are activated:
    ADB 113 combined with LA_Center 115, or
    TSAG 114 combined with LA_Center 115, or
    ADB 113 combined with TSAG 114 with or without DBL 116,
    then the value E_Max is set to 5 and the value G_Err is set to 64/255;

when the following lighting functions are activated:
    ADB 113 on its own or combined with TSAG 114 and LA_Center 115;
    TSAG 114 combined with RW or LA 112;
    then the value E_Max is set to 6 and the value G_Err is set to 64/255;

when the lighting functions ADB 113 combined with LA 112 are activated, then the value E_Max is set to 6 and the value G_Err is set to 96/255;

when the lighting functions ADB 113 and TSAG 114 combined with RW or LA 112 are activated, then the value E_Max is set to 7 and the value G_Err is set to 96/255 for a photometry with or without DBL 116.

In another embodiment, when an OFF photometry is activated, in other words when the numerical value V[i] of all of the pixels P[i] 125 of the original image I[x] 100 is at 0 or off, and when the lighting functions RW, or LA 112, or LA_Center 115 are activated, then the value E_Max is set to 3 and the value G_Err is set to 16/255.

Figure 6:
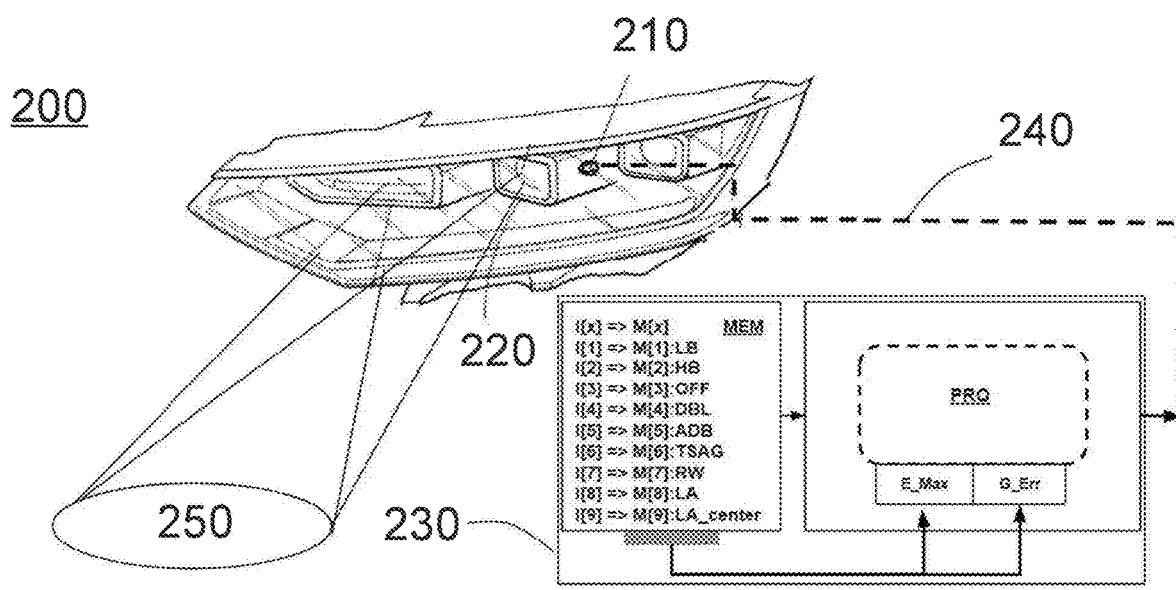
FIG. 6 illustrates a motor vehicle lighting system according to the invention.

FIG. 6 shows a motor vehicle lighting system SYS 200 according to the invention, comprising:

at least one lighting module HL[z] 220 comprising a plurality of light sources, such as LEDs, capable of projecting photometries and/or lighting functions from compressed data LPIS[i];

a multiplexed CAN 240, CAN-FD bus or the like, for transmitting compressed data LPIS[i] to at least one lighting module HL[z] 220;

a control unit PCM 230 intended to implement all of the abovementioned compression steps, so as to generate compressed data PIS[i];

a control unit UC[z] 210 configured to decompress the compressed data, this control unit UC[z] 210 being located in the lighting module HL[z] 220.

Figure 5:
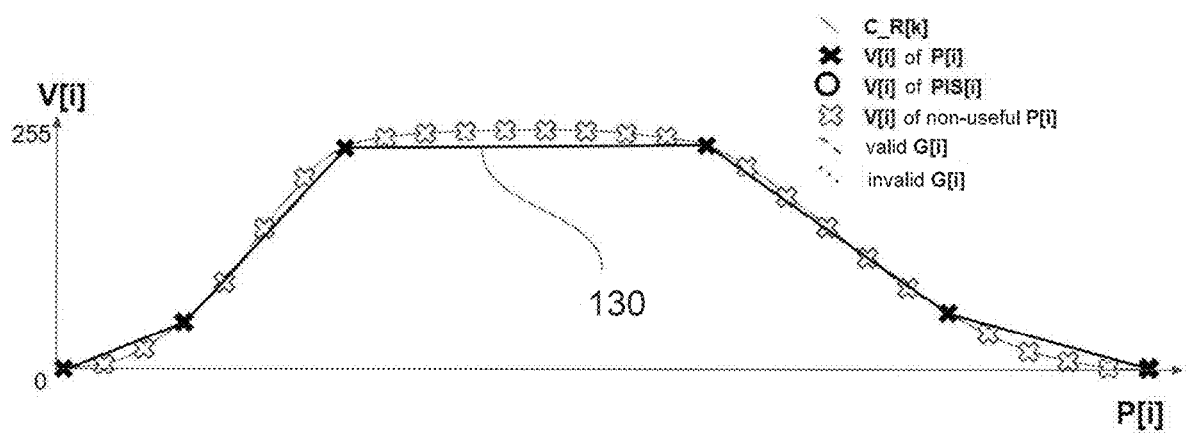
FIG. 5 illustrates the result of a decompression step, according to one embodiment of the invention.

Such a step of decompressing the list LPIS[i] of compressed pixels PIS[i] received via the CAN 240 at the lighting modules HL[z] 220 is performed by way of:

a linear interpolation of the sub-intervals between the significant points of inflection of the curve C_PIS[i] 130 formed by the list of compressed pixels, as seen in FIG. 5, or a polynomial interpolation of the sub-intervals between the significant points of inflection of the curve C_PIS[i] formed by the list of compressed pixels, or an interpolation, using the Bézier curve method, of the sub-intervals between the significant points of inflection of the curve C_PIS[i] formed by the list of compressed pixels, or an interpolation, using the parametric adaptation method, of the sub-intervals between the significant points of inflection of the curve C_PIS[i] formed by the list of compressed pixels, or an interpolation, using the least squares method, of the sub-intervals between the significant points of inflection of the curve C_PIS[i] formed by the list of compressed pixels, or an interpolation, using the exponential modeling method, of the sub-intervals between the significant points of inflection of the curve C_PIS[i] formed by the list of compressed pixels, or an interpolation, using the Fourier series method, of the sub-intervals between the significant points of inflection of the curve C_PIS[i] formed by the list of compressed pixels, or an interpolation, using the Gaussian modeling method, of the sub-intervals between the significant points of inflection of the curve C_PIS[i] formed by the list of compressed pixels, or an interpolation, using the power series method, of the sub-intervals between the significant points of inflection of the curve C_PIS[i] formed by the list of compressed pixels, or an interpolation, using the sums of sines models method, of the sub-intervals between the significant points of inflection of the curve C_PIS[i] formed by the list of compressed pixels, or an interpolation, using the Weibull distribution method, of the sub-intervals between the significant points of inflection of the curve C_PIS[i] formed by the list of compressed pixels, an interpolation, using the personalized models method, of the sub-intervals between the significant points of inflection of the curve C_PIS[i] formed by the list of compressed pixels.

Each lighting module HL[z] 220 makes it possible to obtain a projection of high beams or a resulting image Ir[x] 250 of a quality substantially identical to the original image I[x] 100, having used a method that allows a compression rate close to or greater than 85% depending on the strategy adopted.

Figure 8:
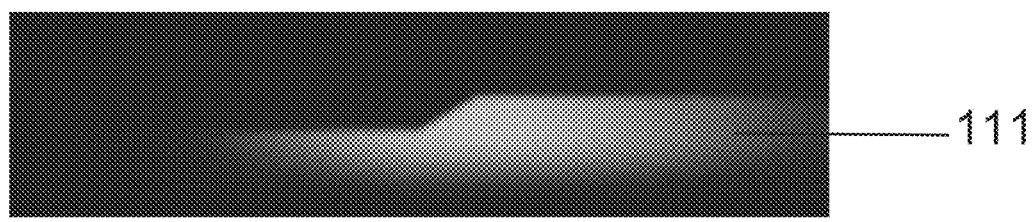
FIG. 8 illustrates a schematic depiction of a photometry relating to an LB, according to the invention.

FIG. 8 illustrates a schematic depiction of a photometry according to an embodiment of the invention relating to a LB 111.

Figure 9:
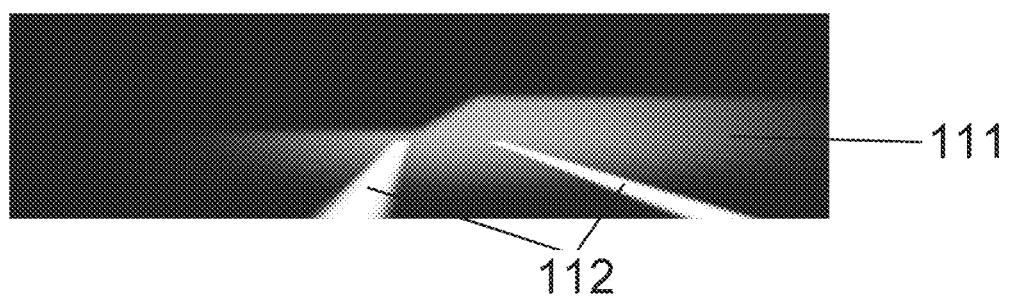
FIG. 9 illustrates a schematic depiction of a photometry relating to an LB with an LA lighting function, according to the invention.

FIG. 9 illustrates a schematic depiction of a photometry according to an embodiment of the invention relating to a LB 111 with an LA 112 lighting function.

Figure 10:
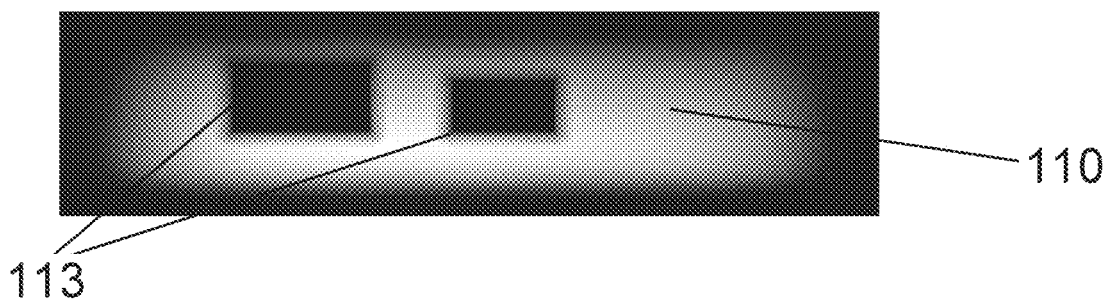
FIG. 10 illustrates a schematic depiction of a photometry relating to an HB with an ADB lighting function, according to the invention.

FIG. 10 illustrates a schematic depiction of a photometry according to an embodiment of the invention relating to a HB 110 with an ADB 113 lighting function.

Figure 11:
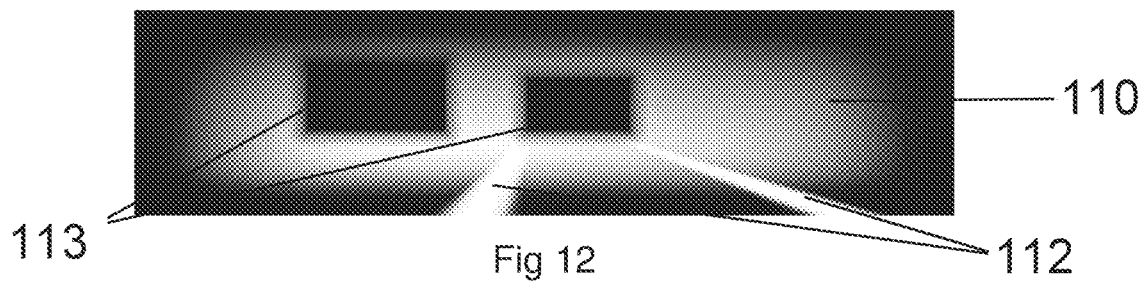
FIG. 11 illustrates a schematic depiction of a photometry relating to an HB with the ADB and LA lighting functions activated, according to the invention.

FIG. 11 illustrates a schematic depiction of a photometry according to an embodiment of the invention relating to a HB 110 with the ADB 113 and LA 112 lighting functions activated.

Figure 12:
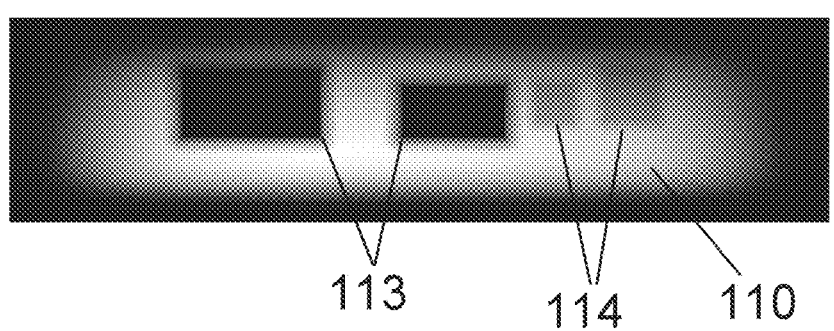
FIG. 12 illustrates a schematic depiction of a photometry relating to an HB with the TSAG and ADB lighting functions activated.

FIG. 12 illustrates a schematic depiction of a photometry according to an embodiment of the invention relating to a HB 110 with the TSAG 114 and ADB 113 lighting functions activated.

FIG. 13 illustrates a schematic depiction of a photometry according to an embodiment of the invention relating to a HB 110 with the TSAG 114, ADB 113 and LA 112 lighting functions activated.

FIG. 14 illustrates a schematic depiction of a photometry according to an embodiment of the invention relating to a HB 110 with the TSAG 114, ADB 113 and LA_Center 115 lighting functions activated.

FIG. 15 illustrates a schematic depiction of a photometry according to an embodiment of the invention relating to HB 110 and DBL 116, with the TSAG 114, ADB 113 and LA 112 lighting functions activated.

What is claimed is:

1. A method for managing image data in a motor vehicle lighting system,
    the lighting system including at least one lighting module intended to project light beams,
    the light beams being generated from data relating to the selection of at least one image,
    each image being respectively defined by a matrix with a plurality of horizontal or vertical rows of pixels, with each pixel characterized by a numerical value related to a light intensity of a pixel, the method comprising:
    receiving an instruction to activate at least one image intended to be projected;
    calculating a gradient value based on the numerical value of a pixel under analysis and on the numerical value of an adjacent pixel for each pixel in each row in the matrix, wherein the numerical value of each pixel corresponds to a number of grayscale levels;
    determining whether the pixel under analysis is a significant point of inflection of a curve relating to the row, based on a difference in intensity [E_Max] between the pixel under analysis and a compressed pixel from a list, and based on a spatial difference [G_Err] between the pixel under analysis and the compressed pixel for each pixel in each row in the matrix;
    storing the pixel under analysis in the list when the pixel under analysis is considered to be a significant point of inflection; and
    transmitting the list to at least one lighting module so that the at least one lighting module is able to project a resulting image.

2. The method of claim 1, wherein the image is selected from among a set of:
    photometries including one or more of low beam (LB), high beam (HB), OFF, and dynamic bending light (DBL); and
    lighting functions including one or more of adaptive driving beam (ADB), traffic sign anti-glare (TSAG), road writing (RW), line assist (LA), and line assist center (LA_Center).

3. The method of claim 1, wherein each gray scale level being characterized by a number on a scale from 0 to 255.

4. The method of claim 1, further comprising decompressing the list of compressed pixels at said lighting modules, by one of the following processes:
    by way of a linear interpolation of a number of sub-intervals between the significant points of inflection of a curve formed by each row of a matrix, or
    by way of a polynomial interpolation of a number of sub-intervals between the significant points of inflection of the curve formed by each row of the matrix, or
    by way of an interpolation of a number of sub-intervals between significant points of inflection of the curve formed by each row of the matrix using a Bézier curve method, or
    by way of an interpolation of a number of sub-intervals between the significant points of inflection of the curve formed by each row of the matrix using a parametric adaptation method, or
    by way of an interpolation of a number of sub-intervals between the significant points of inflection of the curve formed by each row of the matrix using a least squares method, or
    by way of an interpolation of a number of sub-intervals between the significant points of inflection of the curve formed by each row of the matrix using an exponential modeling method, or
    by way of an interpolation of a number of sub-intervals between the significant points of inflection of the curve formed by each row of the matrix using a Fourier series method, or
    by way of an interpolation of a number of sub-intervals between the significant points of inflection of the curve formed by each row of the matrix using a Gaussian modeling method, or
    by way of an interpolation of a number of sub-intervals between the significant points of inflection of the curve formed by each row of the matrix using a power series method, or
    by way of an interpolation of a number of sub-intervals between the significant points of inflection of the curve formed by each row of the matrix using a sums of sines models method, or
    by way of an interpolation of a number of sub-intervals between the significant points of inflection of the curve formed by each row of the matrix using a Weibull distribution method, or
    by way of an interpolation of a number of sub-intervals between the significant points of inflection of the curve formed by each row of the matrix using a personalized models method.

5. The method of claim 1, wherein the compressed pixel is linked only to a particular part of the image.

6. A motor vehicle lighting system comprising:
    at least one lighting module comprising a plurality of light sources able to project at least one photometry or lighting function from a compressed data list,
    a multiplexed bus for transmitting the compressed data list to the at least one lighting module,
    a pixel controller module control unit (PCM) facilitated by hardware driver is configured to:
        receive an instruction to activate at least one image intended to be projected;
        calculate a gradient value based on the numerical value of a pixel under analysis and on the numerical value of an adjacent pixel for each pixel in each row in the matrix, wherein the numerical value of each pixel corresponds to a number of grayscale levels;
        determine whether the pixel under analysis is a significant point of inflection of a curve relating to the row, based on a difference in intensity [E_Max] between the pixel under analysis and a compressed pixel from the compressed data list, and based on a spatial difference [G_Err] between the pixel under analysis and the compressed pixel for each pixel in each row [R[k]] in the matrix [M[x]];

store the pixel under analysis in the compressed data list when the pixel under analysis is considered to be a significant point of inflection; and transmit the compressed data list to the at least one lighting module so that said lighting module is able to project a resulting image.

7. The motor vehicle lighting system of claim 6, wherein the lighting module further includes a driver control unit (UC[z]) configured to decompress the compressed data list.

8. The motor vehicle lighting system of claim 7, wherein the driver control unit (UC[z]) includes a memory that stores at least one Welcome or one Goodbye scenario.

9. The motor vehicle lighting system of claim 6, wherein the plurality of light sources are semiconductor light sources.

* * * * *